(12) United States Patent
Judy

(10) Patent No.: US 6,223,598 B1
(45) Date of Patent: May 1, 2001

(54) SUSPENSION ARRANGEMENT FOR SEMICONDUCTOR ACCELEROMETER

(75) Inventor: Michael W. Judy, Arlington, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 08/878,213

(22) Filed: Jun. 18, 1997

(51) Int. Cl.[7] ............................................... G01P 15/125
(52) U.S. Cl. ..................................... 73/514.32; 73/514.38
(58) Field of Search ........................... 73/514.32, 514.18, 73/514.24, 514.16, 510, 514.38, 504.04, 504.12, 504.14, 504.02; 361/280

(56) References Cited

U.S. PATENT DOCUMENTS

| | | | |
|---|---|---|---|
| 4,342,227 | 8/1982 | Petersen et al. | 73/510 |
| 4,941,354 | 7/1990 | Russell et al. | 73/517 B |
| 5,000,817 | * 3/1991 | Aine | 73/514.18 |
| 5,025,346 | 6/1991 | Tang et al. | 361/283 |
| 5,249,465 | 10/1993 | Bennett et al. | 73/510 |
| 5,345,824 | 9/1994 | Sherman et al. | 73/517 B |
| 5,417,111 | 5/1995 | Sherman et al. | 73/517 B |
| 5,465,604 | 11/1995 | Sherman | 73/514.18 |
| 5,487,305 | 1/1996 | Ristic et al. | 73/514.32 |
| 5,540,095 | 7/1996 | Sherman et al. | 73/514.18 |
| 5,543,013 | 8/1996 | Tsang et al. | 156/643.1 |
| 5,565,625 | 10/1996 | Howe et al. | 73/514.16 |
| 5,578,224 | 11/1996 | Core | 216/2 |
| 5,583,291 | * 12/1996 | Gutteridge et al. | 73/514.32 |
| 5,620,931 | 4/1997 | Tsang et al. | 438/50 |
| 5,621,157 | 4/1997 | Zhao et al. | 73/1.38 |
| 5,760,455 | * 6/1998 | Hierold et al. | 73/514.32 |
| 5,880,369 | * 3/1999 | Samuels et al. | 73/514.32 |
| 5,894,091 | * 4/1999 | Kubota | 73/514.32 |
| 5,895,852 | * 4/1999 | Moriya et al. | 73/504.12 |
| 5,908,986 | * 3/1999 | Mitamura | 73/504.12 |

FOREIGN PATENT DOCUMENTS 0 547 742 A1  9/1992 (EP).
0 810 441 A2  5/1997 (EP).

OTHER PUBLICATIONS

Ahmad et al., "A Two–Dimensional Micromachined Accelerometer," *IEEE Transactions Instruments and Measurement*, vol. 46, No. (Feb. 1997), pp. 18–26.

* cited by examiner

Primary Examiner—Helen Kwok
(74) Attorney, Agent, or Firm—Samuels, Gauthier & Stevens, LLP

(57) ABSTRACT

A suspension mounting arrangement for a suspended layer in a semiconductor accelerometer, the layer being suspended above and spaced apart from a substrate. The arrangement includes a common anchor point associated with the substrate; first and second anchor points associated with the suspended layer; a first flexible serpentine arm coupled between the first anchor point and the common anchor point; and a second flexible serpentine arm coupled between the second anchor point and the common anchor point. The first and second flexible serpentine arms are symmetrically configured with respect to one another.

13 Claims, 7 Drawing Sheets

SUSPENSION ARRANGEMENT FOR SEMICONDUCTOR ACCELEROMETER

BACKGROUND OF THE INVENTION

The invention relates in general to a suspension arrangement for a semiconductor accelerometer, and more specifically to such an arrangement which provides complete symmetry to the entire device.

Surface micromachining is an IC-compatible technology in which a thin film microstructure material (typically polysilicon) is deposited and patterned on a sacrificial spacer layer (typically silicon dioxide), and the spacer is subsequently removed to release the free-standing microstructures. This technology has been used by Analog Devices, Inc. to fabricate integrated accelerometers. The devices typically include a moving mass and fixed cantilever electrodes that are interdigitated within electrodes associated with the moving mass. When the structure experiences an acceleration in the sensitive axis the capacitance between the fixed and moving fingers is changed, and a measurable signal results. Suspension tethers are designed to resist motion in the non-sensitive in-plane axis.

Due to the very small scale dimensions of the elements of a semiconductor accelerometer, particularly the moving mass, several problems can occur. Since the materials used, e.g., polysilicon, result in a uniform stress gradient through the thickness of elements such as the mass, the elements tend to bow or warp. In addition the tensile stress of the mass tends to cause shrinkage. If portions of the mass are too low, thus closer to the substrate surface, there is the possibility of contact and sticking. If the mass contacts or sticks to the underlying substrate, the acceleration measurements become inaccurate. Also, the bowing or warping of elements can result in the electrode fingers not aligning well, thus affecting measurement performance. In all, such problems can be optimized by trimming the responses, however, such techniques are time consuming and expensive.

SUMMARY OF THE INVENTION

Accordingly, in one exemplary embodiment of the invention there is provided a semiconductor device including a substrate; a layer suspended above and spaced apart from the surface of the substrate; and a plurality of suspension members coupled between the substrate and the layer to allow limited movement of the layer relative to a plane parallel to the substrate. Each of the suspension members includes a plurality of symmetrically configured flexible arms.

In an alternative exemplary embodiment of the invention there is provided a semiconductor accelerometer including a semiconductor substrate; a layer of conductive material suspended above and spaced apart from the surface of the substrate, the layer including at least one first capacitive element; at least one second capacitive element associated with the substrate positioned in parallel juxtaposition with the at least one first capacitive element, the first and second capacitive elements forming variable capacitances which vary in accordance with acceleration of movement of the first layer; and a plurality of suspension members coupled between the substrate and the layer to allow limited movement of the layer relative to a plane parallel to the substrate. Each of said suspension members includes a plurality of symmetrically configured flexible arms.

In another exemplary embodiment of the invention there is provided a mounting arrangement for a suspended layer in a semiconductor accelerometer, the layer being suspended above and spaced apart from a substrate. The arrangement includes a common anchor point associated with the substrate; first and second anchor points associated with the suspended layer; a first flexible serpentine arm coupled between the first anchor point and the common anchor point; and a second flexible serpentine arm coupled between the second anchor point and the common anchor point. The first and second flexible serpentine arms are symmetrically configured with respect to one another.

DETAILED DESCRIPTION OF THE ILLUSTRATED EMBODIMENTS

Figure 1:
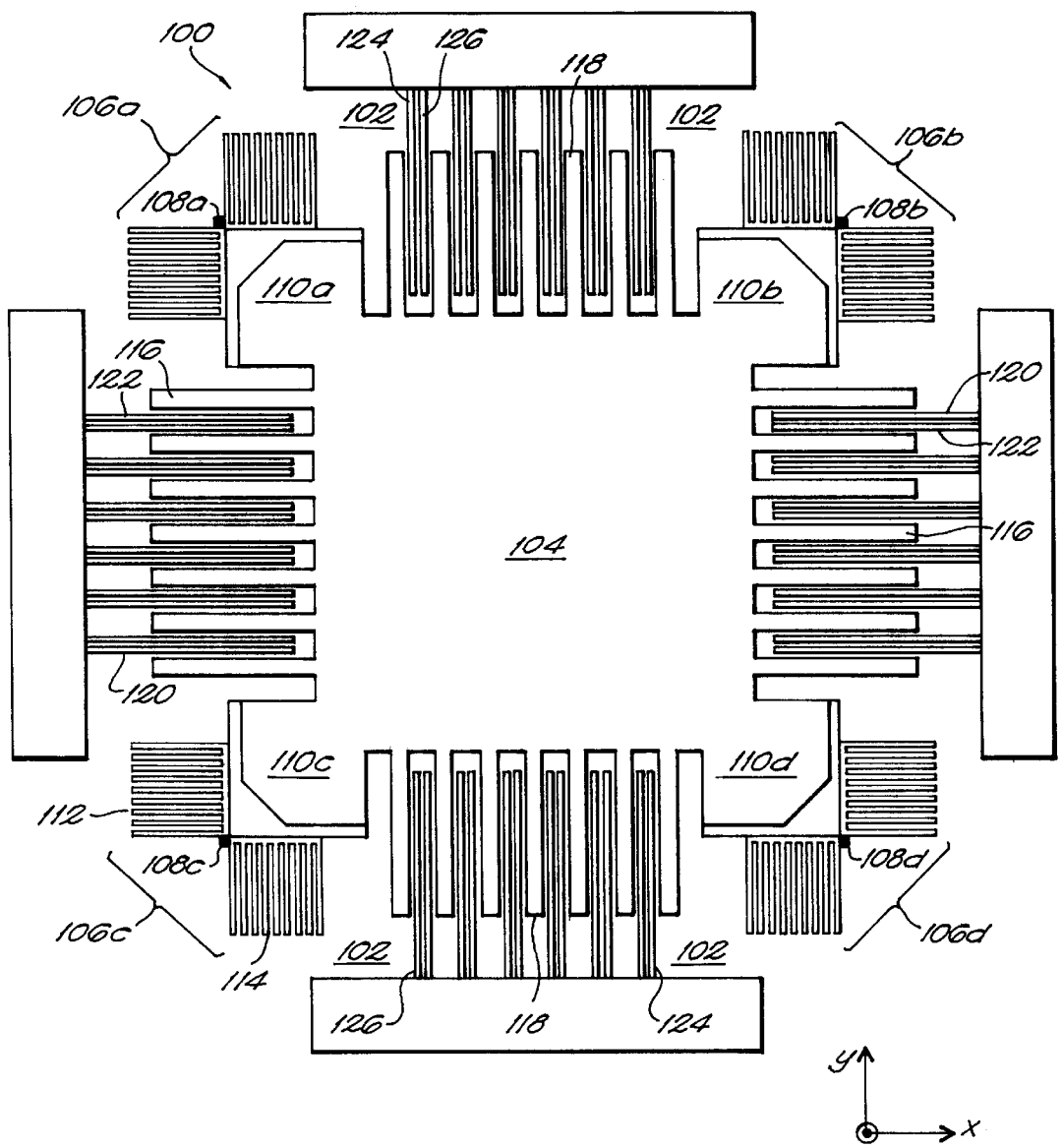
FIG. 1 is a plan view of an exemplary embodiment of a semiconductor two axis accelerometer utilizing suspension members in accordance with the invention.

For purpose of illustration, the exemplary embodiments of the suspension arrangement of the present invention are described as configured with a two axis accelerometer. FIG. 1 shows a plan view of an exemplary embodiment of a micromachined two axis accelerometer 100.

The accelerometer 100 includes a substrate 102 and a conductive mass layer 104. The mass layer 104 is configured parallel to and spaced apart from the underlying substrate 102. The mass layer 104 is mounted for relative movement by way of four suspension members 106a–106d. Each of the suspension members are fixedly attached at one point to the substrate with anchors 108a–108d, and diagonally attached to separate corners 110a–110d of the mass layer 104.

The mass layer 104, in the exemplary embodiment is suspended approximately 1.6 $\mu$m above the surface of the substrate 102. The mass layer 104 is preferably configured as a square, non-rectilinear shape, and is approximately 400 $\mu$m across and 2 $\mu$m thick.

In the illustrated exemplary embodiment of the invention in FIG. 1, each of the suspension members 106 includes first 112 and second 114 serpentine arms. The serpentine arms are configured to allow for limited movement of the mass layer 104 in two orthogonal axes (X and Y) in the plane parallel to both the substrate 102 and the mass layer 104, and to some extent in a third axis (Z) perpendicular to the substrate. The suspension members 106 add compliance to the structure, and tend to alleviate the problems of tensile stress in the mass layer. In addition, the entire accelerometer 100 is completely symmetrical by having 4-fold symmetry.

The accelerometer 100 is fabricated with a silicon substrate and a mass layer 104 of polysilicon using surface micromachining techniques as described in more detail in U.S. Pat. Nos. 5,345,824, 5,417,111, 5,465,604, 5,487,305, 5,540,095, 5,543,013, 5,565,625, 5,578,224, 5,620,931 and 5,621,157, all of which are incorporated herein by reference. It will be appreciated that the accelerometer structure is by no means limited to polysilicon, e.g., plated metals, oxide/metal composite, or bulk silicon can be used. In general, the accelerometer structure consists of an inertial proof mass which is connected to a substrate through suspension members. Acceleration in the plane of the substrate is measured using capacitive electrodes (i.e. fingers or plates) as will be described hereinafter.

Both the substrate 102 and mass layer 104 have structures attached thereto which serve to sense movement along the X and Y axes. In the illustrated embodiment, the structures are a plurality of interdigitated fingers. The mass layer 104 includes a plurality of parallel spaced apart fingers 116 and 118 extending outwardly, in the plane of the mass layer 104, from the four sides of the mass layer 104 in the X and Y directions, respectively.

The substrate 102 includes a plurality of electrically attached parallel spaced apart fingers 120, 122, 124, and 126 which are arranged to extend inwardly, in the plane of the mass layer 104, towards the sides of the mass layer 104. Finger pairs 120/122 and 124/126 are positioned to so that each finger is parallel to a finger 116 and 118, respectively, and adjacent thereto on a longitudinal side thereof so as to produce a capacitance therebetween. Fingers 120 and 122 are positioned parallel to the X axis and on opposite sides of the fingers 116 which are parallel to the X axis. Fingers 124 and 126 are positioned parallel to the Y axis and on opposite sides of the fingers 118 which are parallel to the Y axis. In the exemplary embodiment, the fingers are configured to be 4 $\mu$m wide, 2 $\mu$m thick, and have an overlapping length of 100 $\mu$m.

For purposes of illustration, the mass layer 104, and thus fingers 116 and 118, is adapted to be connected to a common potential through one or more of the suspension members 106. The fixed fingers 120 are electrically connected together, and the fixed fingers 122 are electrically connected together. Accordingly, variable capacitances are formed between each movable finger 116 and the corresponding adjacent fixed fingers 120 and 122. In addition, the fixed fingers 124 are electrically connected together, and the fixed fingers 126 are electrically connected together. Accordingly, variable capacitances are formed between each movable finger 118 and the corresponding adjacent fixed fingers 124 and 126.

A capacitance is formed between each fixed finger and its corresponding adjacent movable finger because of the close parallel proximity of the fingers. The capacitance between the pairs of fingers is very small, however, the connection of a plurality of parallel fingers provides a measurable capacitance, for example, on the order of 100 femtofarads. As an example, as the movable fingers 116 move towards fixed fingers 120 and away from fixed fingers 122, a differential capacitance is generated. The variations in capacitance are measured by processing circuitry which convert the differential capacitances into signals corresponding to the acceleration of the mass layer 104 which caused the fingers 116 to move.

There are three main advantages to the illustrated exemplary embodiment of accelerometer 100. First, the structure has 4-fold symmetry that allows the response in both the X and Y axes to be the same. Second, the capacitive electrodes or fingers are arranged such that a differential capacitance is measured, thus producing better linearity. Finally, the structure is smaller than using two single axis in-plane accelerometers. By sharing the mass in the X and Y axes, the invention makes more efficient use of the silicon chip area.

Figure 2:
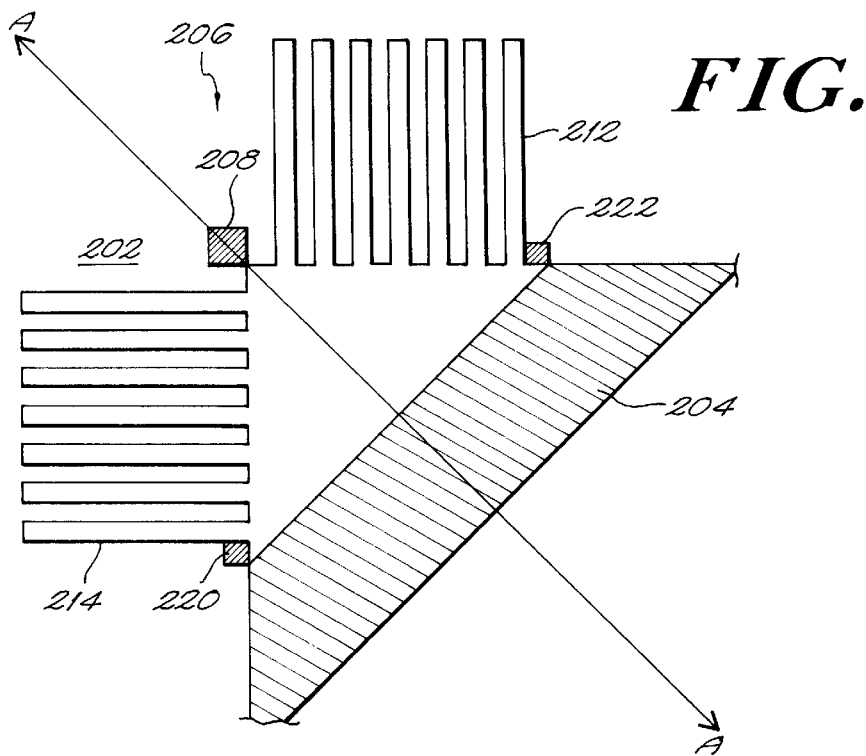
FIG. 2 is an enlarged plan view of a suspension member in accordance with the invention.

FIG. 2 is an enlarged plan view of an exemplary embodiment of a suspension member 206 having first 212 and second 214 serpentine arms in accordance with the invention. The suspension member 206 is attached to a corner of an associated mass layer 204 at connection points 220 and 222. The suspension member is attached to the underlying substrate 202 via an anchor 208. As described with respect to the exemplary embodiment of FIG. 1, the anchor suspends both the suspension member 206 and the mass layer 204 approximately 1.6 $\mu$m above the substrate surface. In addition, the suspension member is configured to be completely symmetrical about the axis A.

Figure 3:
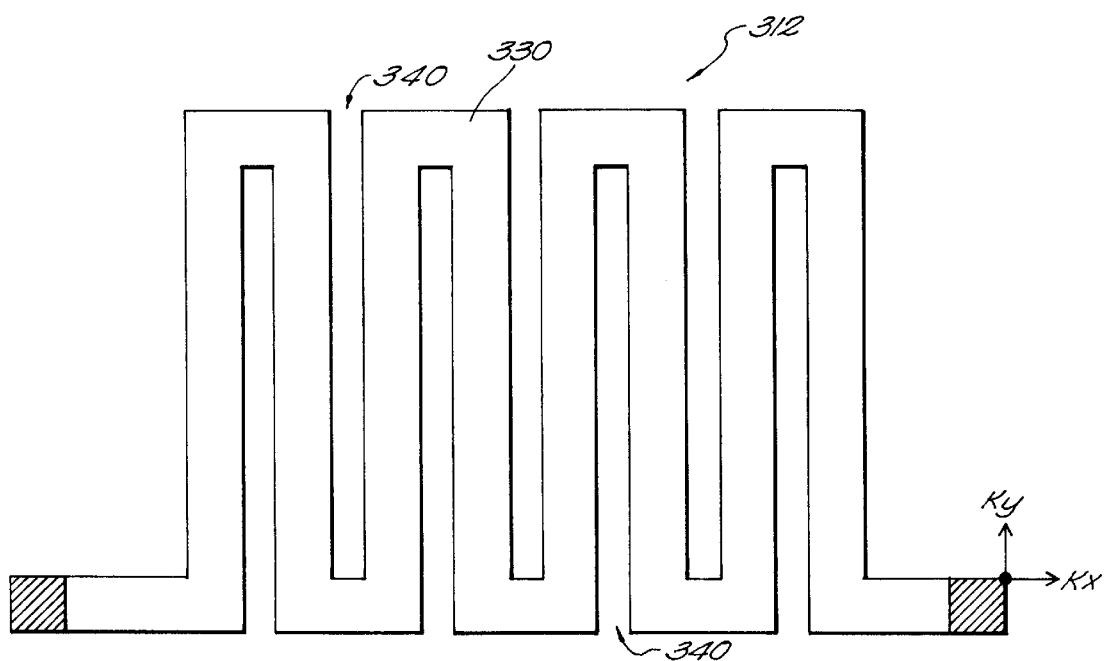
FIG. 3 is an enlarged plan view of a serpentine arm of a suspension member in accordance with the invention.

With reference to FIG. 3, there is shown an exemplary embodiment of a single serpentine arm 312 for use in a suspension member such as that illustrated in FIG. 2. The serpentine arm includes a line element 330 and gaps 340 or spaces between portions of the line element as it is wound. In the exemplary embodiment, the line element 330 is nominally 2 $\mu$m wide, ±0.2 $\mu$m due to processing, while the gap 340 is nominally 1 $\mu$m, ±0.2 $\mu$m due to processing. It will be appreciated that the serpentine arm has a spring constant $k_x$ for the X axis and a spring constant $k_y$ for the Y axis. The resonant frequency for such a structure is defined as $f=\sqrt{K/M}$, where f is the resonant frequency, K is the spring constant, and M is the mass. In addition, the scale factor for gain (change of position) for such a structure is defined as $x=Ga=(M/K)a$, where G is the gain, x the position, and a is acceleration.

The serpentine arm suspension of the invention creates the most structure compliance in the least chip area. The gaps in the suspensions can be made to track the gaps in the capacitive electrodes (fingers) to help minimize the effect of overetch on the response of the entire structure. The 4-fold symmetry of the exemplary embodiment of FIG. 1 must be maintained to produce the best matching between the X and Y axes. In other words, the X and Y gain need to be the same. A 2-fold symmetry can be used, but the matching will not be as accurate. There are two sources of cross-talk between the axes. The dominate source is the slight mechanical mismatch between the etching characteristics in the X and Y axes. There can also be an electrical cross talk which is a result of the demodulation technique used to sense the position of the mass layer.

The benefits of using a symmetrical suspension arrangement as in the invention is that the ratio of $k_x$ and $k_y$ is constant with respect to processing variations. The absolute value changes, but there is no concern about the other axis. If one axis is trimmed, the other axis need not be trimmed. The serpentine arrangement has the lowest compliance per unit silicon wafer area.

Figure 4:
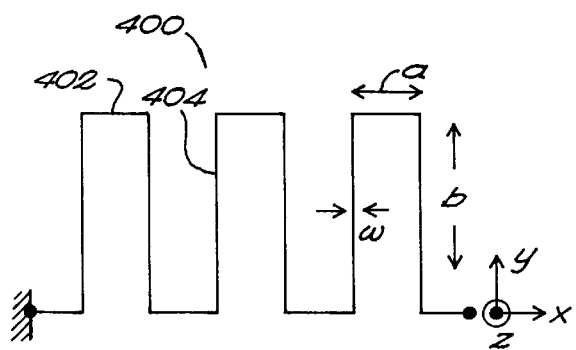
FIG. 4 is a schematic diagram of a suspension member having serpentine arms.

With reference now to FIG. 4, the basic theory of serpentine springs is described. FIG. 4 is a schematic diagram of a serpentine spring 400. The illustrated serpentine spring has three loops having six short beams a (402) and six long beams b (404). It will be assumed that the line element of the serpentine spring has a rectangular cross section. Also, it will be appreciated that the spring constants in the X and Y axes are functions of width.

The serpentine spring is analyzed as follows:

$$k_x \approx \frac{48EI_{z,b}}{a^2(c+b)n^3}$$

$$k_y \approx \frac{48EI_{z,b}}{b^2(3c+b)n}$$

$$k_z \approx \frac{48GJ_b}{a^2\left(\left(\frac{GJ_b}{EI_{x,a}}\right)a+b\right)n^3}$$

all for large n. The factor n herein is equal to the number of long beams 404 plus one, thus in the illustrated case n=7. Also, $c=(I_{z,b}a)/(I_{z,a})$, $I_{z,b}=(1/12)tw_b^3$, $I_{z,a}=(1/12)tw_a^3$, $I_{x,a}=(1/12)w_a t^3$, t is the thickness of the line element, $w_a$ is the width of beam a, $w_b$ is the width of beam b, E is Young's modulus, G is the shear modulus, and $J_b$ is the rotational moment.

Figure 5A:
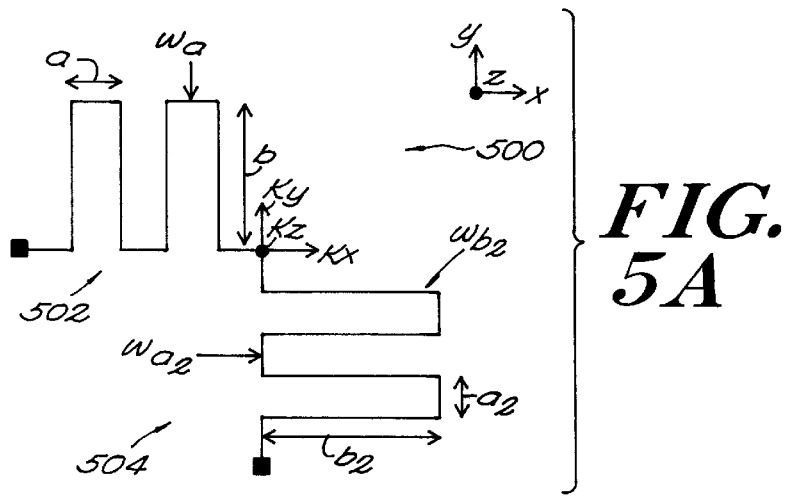
FIGS. 5A and 5B are schematic diagrams of a suspension member showing the composite spring constants and individual spring constants for each serpentine arm, respectively.
Figure 5B:
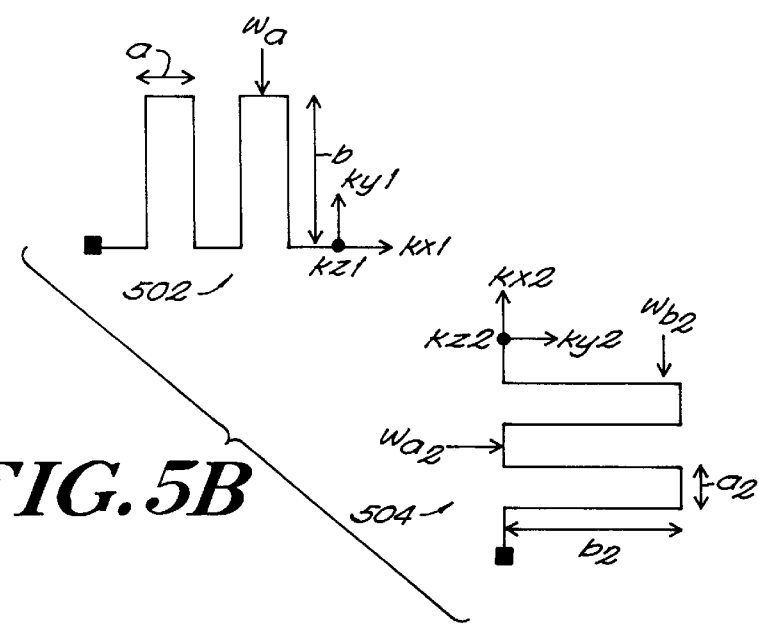

FIG. 5A is a schematic diagram of a suspension member 500 with two serpentine arms 502 and 504, which is similar to that of suspension member 200 shown in FIG. 2. The suspension member has composite spring constants in the X, Y and Z axes, specifically $K_X$, $K_Y$ and $K_Z$. FIG. 5B is a schematic diagram of the suspension member 500 with a further analytical breakdown of each serpentine arm 502 and 504.

It will be appreciated that ideally the number of loops or turns n of each serpentine arm are equal, as well as the long and short beam lengths and widths. Thus, $a=a_2$, $b=b_2$, $w_a=w_{a2}$, and $w_b=w_{b2}$.

Accordingly, it will be appreciated that $K_X=k_{x1}+k_{y2}$, $K_Y=k_{y1}+k_{x2}$, and $K_Z=k_{z1}+k_{z2}$. Thus, $K_{XY}=K_X/K_Y$.

It was previously stated that the spring constants in the X and Y axes are functions of width. Thus, it is likely that the widths will vary due to processing effects. For nominal widths of a single serpentine arm as shown in FIG. 4, $k_x=k_y$. For not nominal widths of a single serpentine arm, $k_x \ne k_y$. In this situation, the measured signal for the X and Y axes will change, which requires further trimming.

However, the suspension member 500 in accordance with the invention promotes the need for the X and Y axis gain to be the same. The composite spring constants $K_X$ for the X axis and $K_Y$ for the Y axis will track each other due to the elements of the equations $K_X=k_{x1}+k_{y2}$ and $K_Y=k_{y1}+k_{x2}$. The serpentine arms provide longer arms for better averaging to minimize local effects. The suspension member 500 with serpentine arms provides compliance for the attached mass layer such that the stiffness is the same in any given direction.

Figure 6:
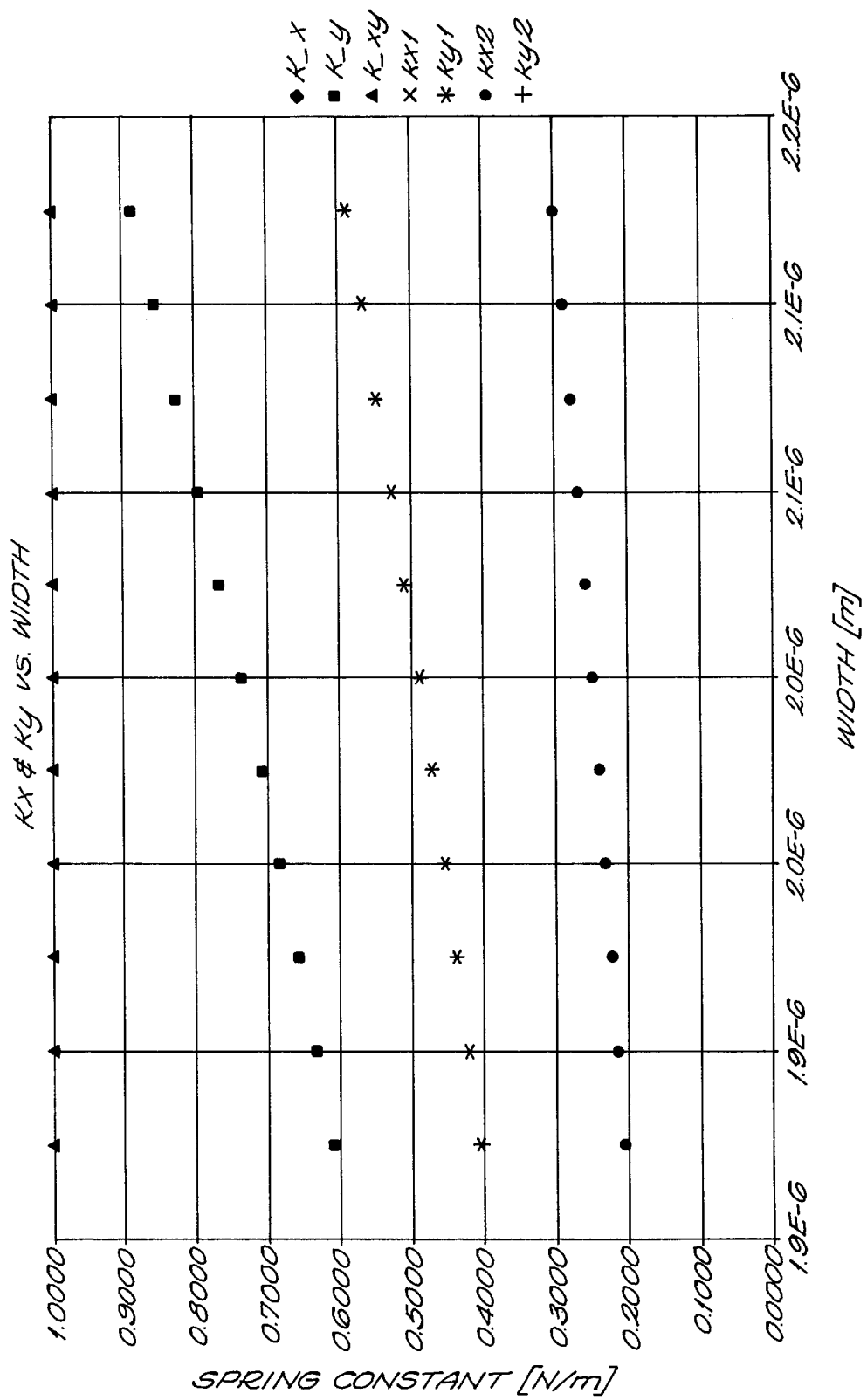
FIG. 6 is a plot showing the ratio of $K_X/K_Y$ constant with respect to width changes due to processing for the suspension member of FIG. 5.

FIG. 6 is a plot showing the ratio of $K_X/K_Y$ being constant and equal to 1 with respect to width changes due to processing for the suspension member 500. In addition, the ratios of $k_{x1}/k_{y1}$ and $k_{x1}/k_{y1}$ are constant with respect to width changes, but do not equal 1. By using two serpentine arms in conjunction to create the 4-fold symmetry of the invention, one can achieve $K_X=K_Y$ over process variations.

Figure 7:
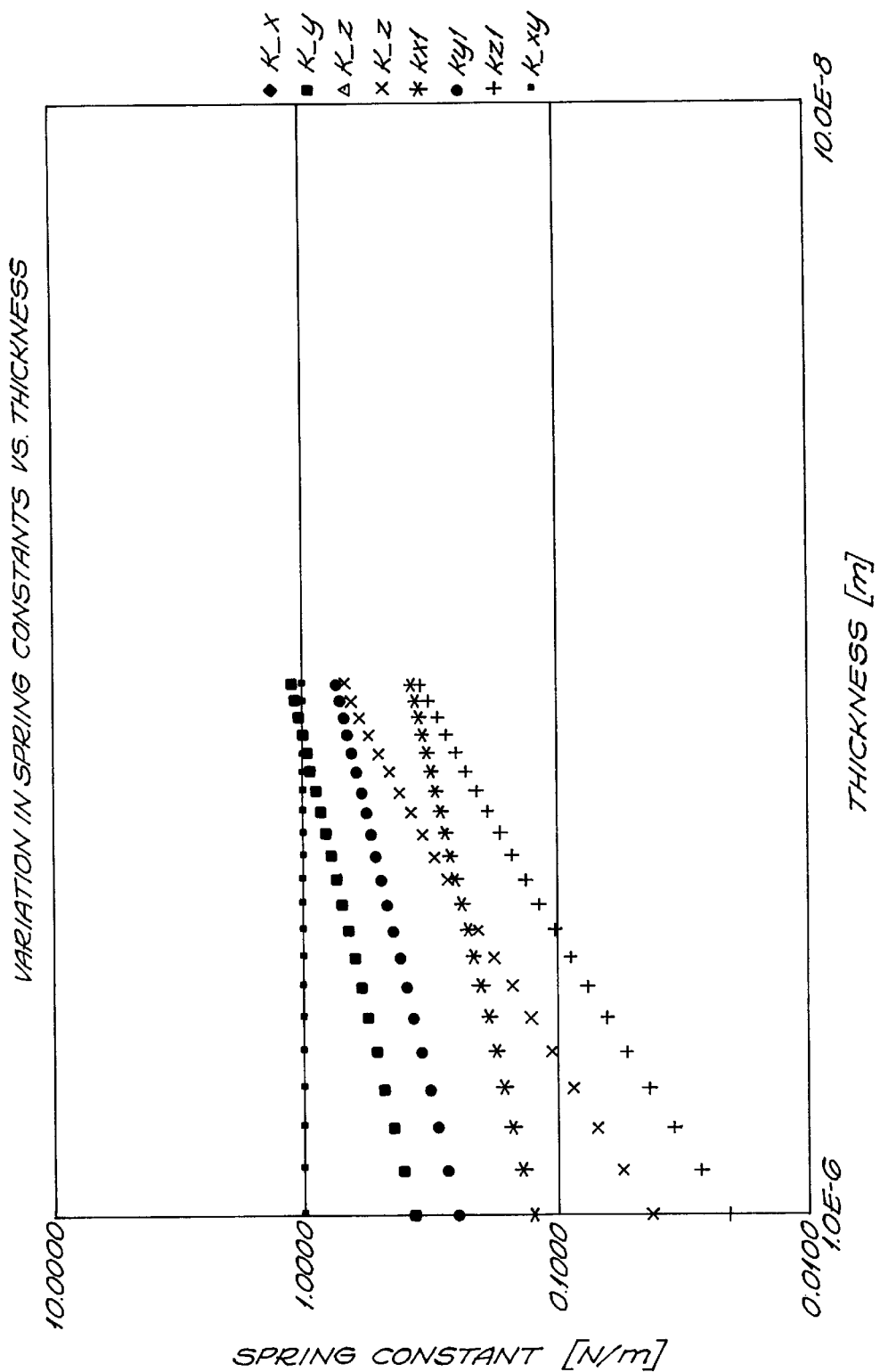
FIG. 7 is a plot of the variation in spring constants versus thickness for the suspension member of FIG. 5.
Figure 8:
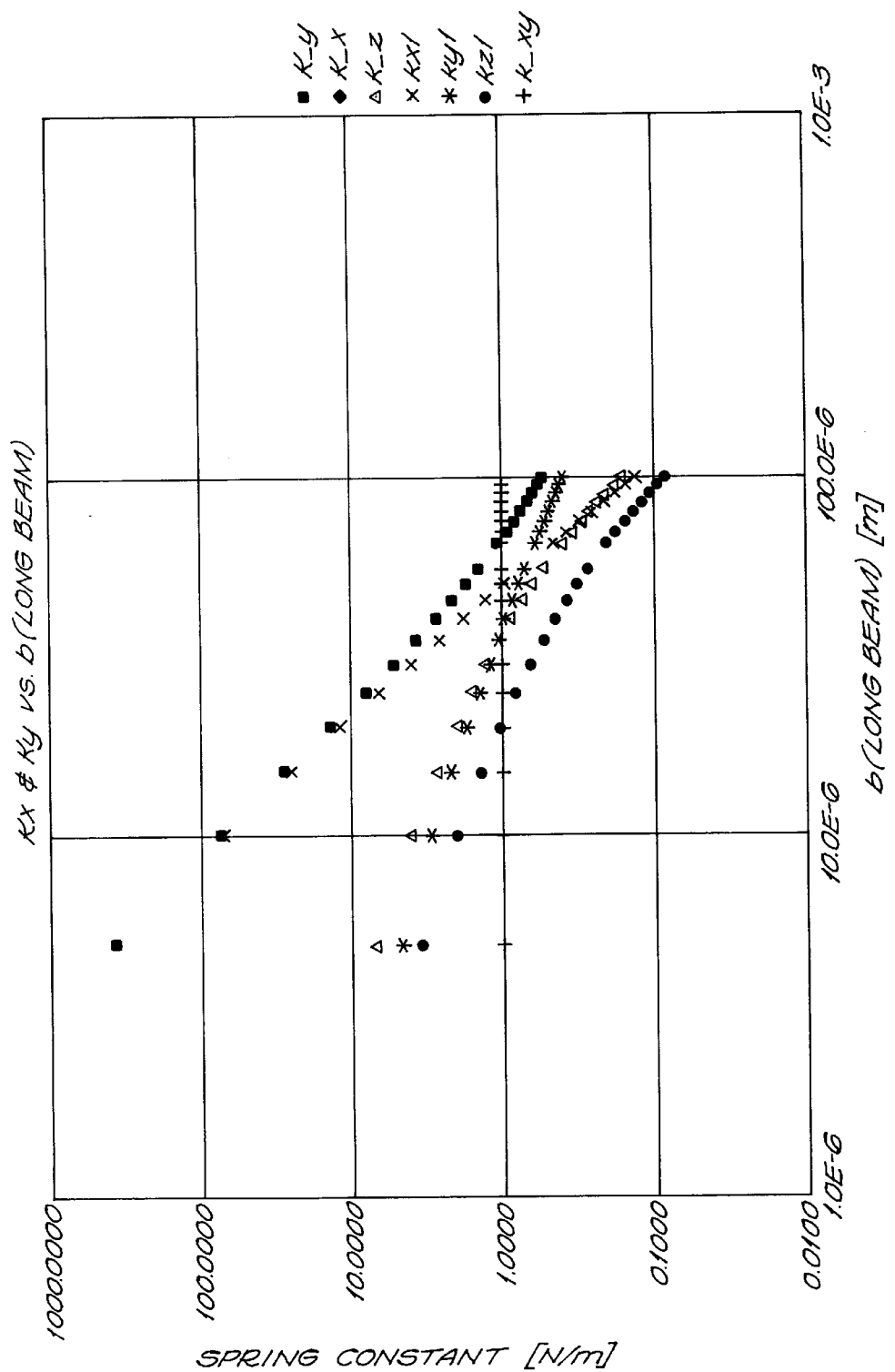
FIG. 8 is a plot of the spring constant $K_X/K_Y$ versus the length of a long beam of a serpentine arm.
Figure 9:
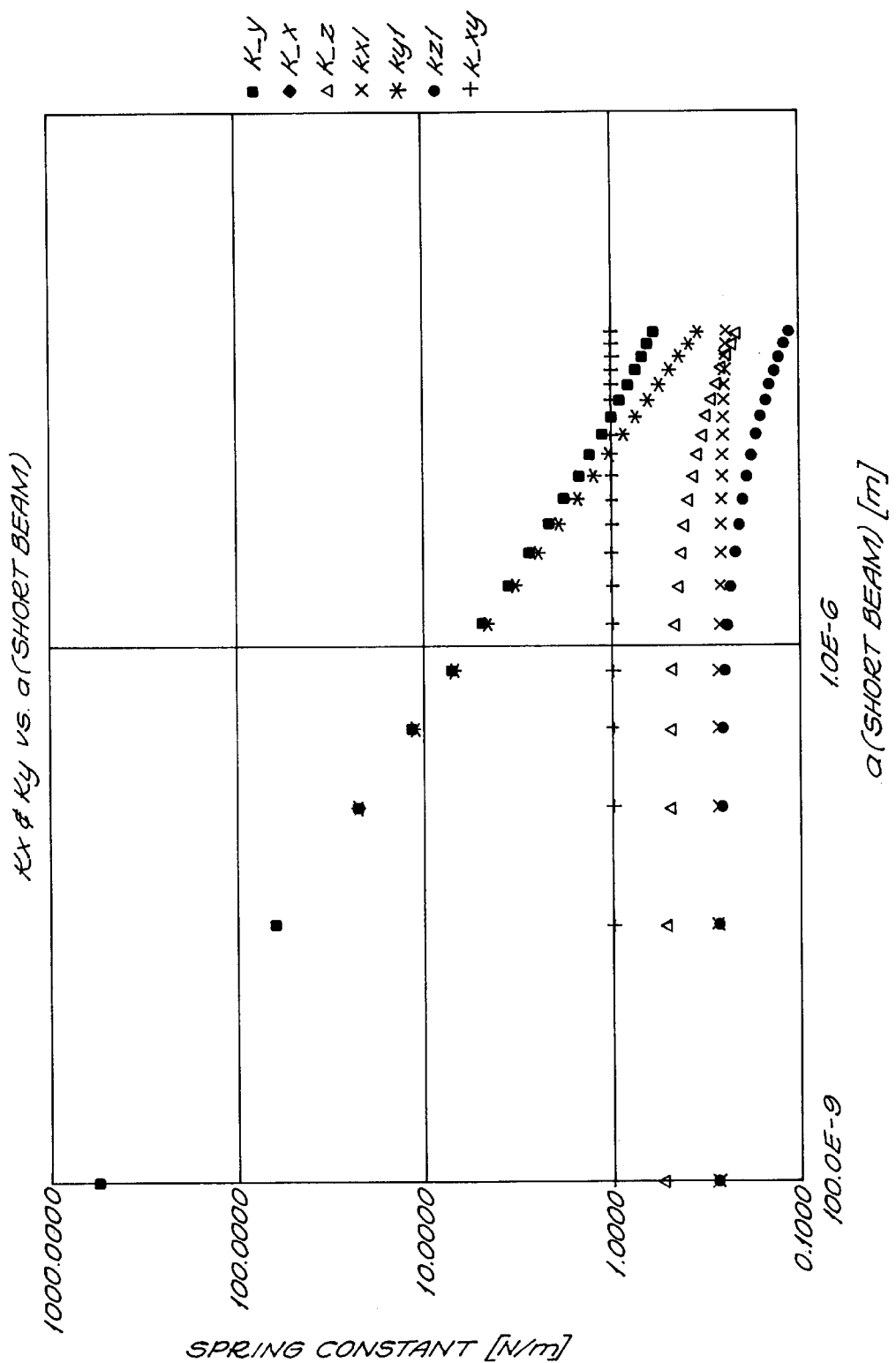
FIG. 9 is a plot of the spring constant $K_X/K_Y$ versus the length of a short beam of a serpentine arm.

FIG. 7 is a plot of the variation in spring constants versus thickness for the suspension member 500. It will be appreciated that thickness changes do not affect the spring constant $K_X/K_Y$. FIG. 8 is a plot of the spring constant $K_X/K_Y$ versus the length of the long beam b. Note that n=19, a=3.3 μm, t=2 μm and w=2 μm. FIG. 9 is a plot of the spring constant $K_X/K_Y$ versus the length of the short beam a. Note that n=19, b=80.2 μm, t=2 μm and w=2 μm.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A semiconductor device comprising:

a substrate;

a layer suspended above and spaced apart from the surface of said substrate, said layer including at least one first capacitive element;

at least one second capacitive element associated with said substrate positioned in parallel juxtaposition with said at least one first capacitive element so as to define first gaps between each of said at least one first capacitive element and adjoining said at least one second capacitive element; and a plurality of suspension members coupled between said substrate and said layer to allow limited movement of said layer relative to a plane parallel to said substrate, each of said suspension members including a plurality of symmetrically configured flexible serpentine arms having second gaps defined therebetween, wherein said first and second gaps are configured to track one another so as to maintain constant gap widths, and each of said suspension members has spring constants such that the response in a first direction is equal to the response in a second direction orthogonal to said first direction, and said device is configured with 4-fold symmetry in the plane of the substrate.

2. The device of claim 1, wherein said suspension members are compliant and provide flexure to said layer.

3. The device of claim 1, wherein said suspension members are coupled to four corners of said layer.

4. The device of claim 1, wherein said device comprises an accelerometer.

5. A semiconductor accelerometer comprising:

a semiconductor substrate;

a layer of conductive material suspended above and spaced apart from the surface of said substrate, said layer including at least one first capacitive element;

at least one second capacitive element associated with said substrate positioned in parallel juxtaposition with said at least one first capacitive element so as to define first gaps between each of said at least one first capacitive element and adjoining said at least one second capacitive element, said first and second capacitive elements forming variable capacitances which vary in accordance with acceleration of movement of said first layer; and a plurality of suspension members coupled between said substrate and said layer to allow limited movement of said layer relative to a plane parallel to said substrate, each of said suspension members including a plurality of symmetrically configured flexible serpentine arms having second gaps defined therebetween, wherein said first and second gaps are configured to track one another so as to maintain constant gap widths, and each of said suspension members has spring constants such that the response in a first direction is equal to the response in a second direction orthogonal to said first direction, and said accelerometer is configured with 4-fold symmetry in the plane of the substrate.

6. The accelerometer of claim 5, wherein said suspension members are compliant and provide flexure to said layer.

7. The accelerometer of claim 5, wherein said suspension members are coupled to four corners of said layer.

8. The accelerometer of claim 5, wherein said accelerometer comprises a multi-axis accelerometer.

9. The accelerometer of claim 5, wherein the acceleration of movement of said layer is measured in accordance with a differential capacitance generated between said at least one first capacitive element and said at least one second capacitive element.

10. A mounting arrangement for a suspended layer in a semiconductor accelerometer, said layer being suspended above and spaced apart from a substrate to allow limited movement of said layer relative to a plane parallel to said substrate, said layer including a plurality of first capacitive elements, a plurality of second capacitive elements being associated with said substrate positioned in parallel juxtaposition with said first capacitive elements so as to define first gaps between each of said first capacitive elements and said adjoining second capacitive elements, said arrangement comprising:

a common anchor associated with said substrate;

first and second connection points associated with said suspended layer;

a first flexible serpentine arm coupled between said first connection point and said common anchor; and a second flexible serpentine aim coupled between said second connection point and said common anchor, wherein said first and second flexible serpentine arms are symmetrically configured with respect to one another and having second gaps defined therebetween, wherein said first and second gaps are configured to track one another so as to maintain constant gap widths, said first and second serpentine arms comprise spring constants such that the response in a first direction is equal to the response in a second direction orthogonal to said first direction, and said accelerometer is configured with 4-fold symmetry in the plane of the substrate.

11. The accelerometer of claim 10, wherein said serpentine arms are compliant and provide flexure to said layer.

12. The accelerometer of claim 10, wherein said serpentine arms are coupled to four corners of said layer.

13. The accelerometer of claim 10, wherein said accelerometer comprises a multi-axis accelerometer.

* * * * *